United States Patent
Zunuino et al.

(10) Patent No.: US 9,558,092 B2
(45) Date of Patent: Jan. 31, 2017

(54) RUNTIME-AGNOSTIC MANAGEMENT OF APPLICATIONS

(75) Inventors: Gilles Zunuino, Kirkland, WA (US); William Scheidel, Seattle, WA (US); David Wortendyke, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 264 days.

(21) Appl. No.: 13/316,580

(22) Filed: Dec. 12, 2011

(65) Prior Publication Data

US 2013/0152102 A1 Jun. 13, 2013

(51) Int. Cl.
*G06F 9/46* (2006.01)
*G06F 11/30* (2006.01)

(52) U.S. Cl.
CPC ........ *G06F 11/3006* (2013.01); *G06F 11/302* (2013.01); *G06F 11/3055* (2013.01); *G06F 11/3089* (2013.01)

(58) Field of Classification Search
None
See application file for complete search history.

(56) References Cited

U.S. PATENT DOCUMENTS 7,533,301 B2   5/2009   Nye et al.
8,032,890 B2 * 10/2011  Brendle ................. G06F 9/485
                                                        709/225
2005/0015430 A1   1/2005   Rothman et al.
2006/0190482 A1 * 8/2006   Kishan et al. ............ 707/103 Y
2008/0189713 A1   8/2008   Betzler et al.

FOREIGN PATENT DOCUMENTS

WO    WO 2005022385    *  3/2005

OTHER PUBLICATIONS

Seinturier, et al., "Reconfigurable SCA Applications with the FraSCAti Platform", IEEE International Conference on Services Computing (SCC), Sep. 21-25, 2009, pp. 268-275.
Harmer, et al., "An application-centric model for cloud management", Proceedings of the IEEE 6th World Congress on Services (Services-1), Jul. 5-10, 2010, pp. 439-446.
Anand, Karandeep, "Introducing Windows Azure AppFabric Applications", Jun. 20, 2011, pp. 4
"Paremus Service Fabric and Paremus Nimble", Retrieved Date: Sep. 21, 2011, p. 1.
Goble, et al., "Building Large-scale, Service-Oriented Distributed Systems using Semantic Models", Version 1.0, Jul. 27, 2010, pp. 1-21.

* cited by examiner

*Primary Examiner* — Mengyao Zhe
(74) *Attorney, Agent, or Firm* — Ben Tabor; Kate Drakos; Micky Minhas

(57) ABSTRACT

An application may be modeled as a collection of resource usage. The model allows the application to be elastic so that additional resource usage can be added when needed. Items may be added to and/or removed from applications at any time without regard to the state of the application. Existing items in the application may also be altered at any time regardless of the application state. A set of interfaces are used to manage the resources. The interface allow for the provisioning, configuration, deployment, monitoring and diagnostics of resources in a consistent way.

20 Claims, 7 Drawing Sheets

RUNTIME-AGNOSTIC MANAGEMENT OF APPLICATIONS

BACKGROUND

Most computer applications are managed separately from resources that are used by the applications. For example, an SQL database is created and managed from a different toolset than the web application that uses the SQL database. This leads to increased management complexity and cost. Existing management tools tend to assume that applications are designed, built and deployed as a unit. In actual practice, most applications are built incrementally. Current management tools and models are ill suited to handle the elastic nature of application development and deployment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments define a resource and application model that is used to manage applications. A set of interfaces are defined to abstract management operations across resources. A set of common management verbs define actions that can be performed against resources.

A model is defined to capture the capabilities of resources, such as like SQL databases, DNS records, cloud services, and web services. Applications are modeled as a collection of resource usages. This allows resource usages to be captured as part of the application. All application requirements for the resource are also expressed in the model.

This notion of an application allows for elasticity and N-as-1 management. Elasticity means that resources usage can be added, removed, or altered at any time without impacting the running application. N-as-1 management means that it is possible to define common verbs, such as "update," on all resources. This allows users to execute the verbs on the application. This method of management emits those verbs against all resources used by the application.

In one embodiment, interfaces abstract management operations across resources. The set of interfaces may be defined to abstract common management operations such as command and control, health monitoring, diagnostics, and configuration. Command and control includes a set of management verbs, including, for example, "deploy" and "stop," that can be executed on the application Health monitoring provides real-time application health information. Diagnostics include logs, trace files, crash dumps, etc. Configuration operations configure application and the resources used by the application. Using these interfaces allows all resources to be treated in a similar fashion.

In one embodiment, a model defines resources used by applications. The model defines an application as a collection of resource usage for the purpose of management. The model allows applications to be elastic. Items may be added to and/or removed from applications at any time without regard to the state of the application (i.e., deployed, running, etc.). Also, existing items may be altered at any time regardless of the state of the application. A set of interfaces abstract the notion of a resource for management purposes. The interfaces allow the provisioning, unprovisioning, configuration, deployment, undeployment, monitoring and diagnostics of resources in a consistent way. Instance of applications that are defined with this model may be managed through the interfaces.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Applications may be defined using an elastic model in which the application is built piece-by-piece or incrementally. An application may be defined as a combination of resources. The resources are the building blocks of the applications and may include any facilities available to applications, such as storage, compute, messaging, web services, DNS records, or other components.

Figure 1:
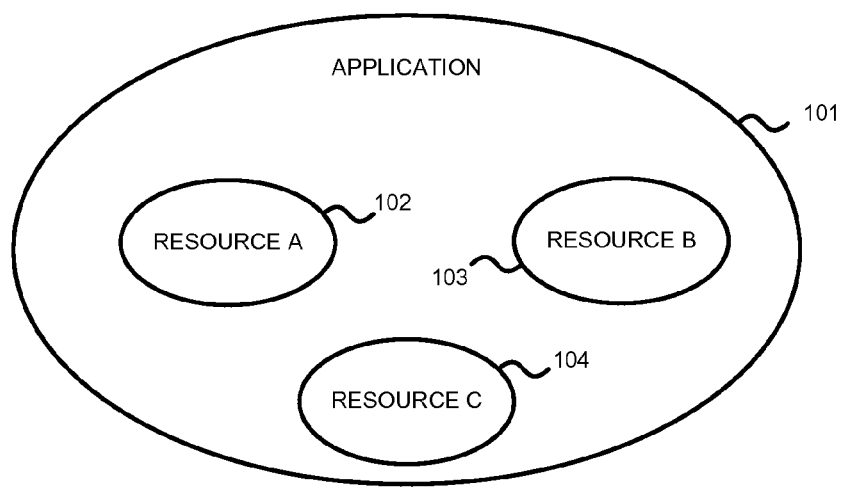
FIG. 1 is a block diagram illustrating an application defined as a set of resource usage.

FIG. 1 is a block diagram illustrating an application 101 defined as a set of resource usage. The resource usage describes the resources 102-104 used by the application 101. Resource usage may be described by metadata, such as:

resource Name;
resource Type;
zero or more Artifacts;
resource-specific Metadata; and
zero or more Requirements.

For each resource 102-104, metadata defines how the resource will interact with the application.

Figure 2:
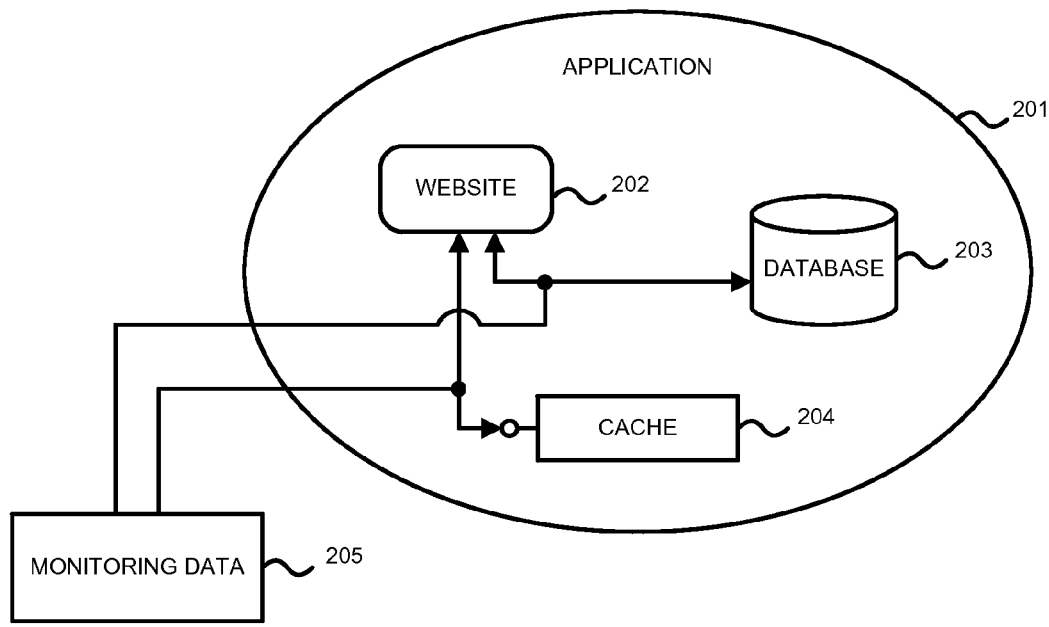
FIG. 2 is a block diagram illustrating building an application.

FIG. 2 is a block diagram illustrating the building of an application 201. Initially, application 201 is empty and then resources are added. For example, a website 202 may be added to the application. Later, a database 203 may be added. Metadata may be used to define how the website 202 uses the database 203. The application does not have to be considered complete and may be modified at any time. For example, cache 204 may also be added to application 201.

Resource usage is defined using metadata. For example, database resource 203 may be defined by the following metadata:
   Name: Database 1;
   Type: SQL server;
   Artifacts: (e.g., BLOBs, DacPack, etc.);
   Resource-specific Metadata: (e.g., connection string to database);
   Requirements: (e.g., at least 5 Gb database size).

A resource usage schema may provide a serialized format for the application model. The resource usage schema includes, for example, data and instructions on how to create and configure the resource. A resource usage schema for a hosted service, such as website 202, may describe the files needed to create the website, what ports the website should listen one, etc. A resource usage schema for database 203 may include an SQL file with instructions for creating the database and other information for configuring the database. A resource usage schema for cache 204 may define a cache size, regions in the cache, a protocol to communicate with the cache, etc.

The application is defined using an application schema that identifies the resources in the application and the interconnections and interactions of the resources. An application schema may have the following parts:
   a Name;
   a Version; and
   an array of Resource Usage.

An example application schema for an empty application is:

```
{
    "Name": "App1",          <- application name
    "Version": "1.0.0",      <- application version
    "Resources": [           <- array of resource usage
                             <- zero or more resource usage
    ]
}
```

One or more resources may be added to this application schema to define an application. For example, referring to the example application shown in FIG. 2, the application schema for application 201 may be:

```
{
    "Name":       "App1",
    "Version":    "1.0.0",
    "Resources":  [
        {
         "Name": "Hosted Service 1",
         "Type":
         "Microsoft.ApplicationServer.Management.HostedService",
         "Artifacts": [
                 { "Name": "cscfg", "Path":
                 "ServiceConfiguration.cscfg" },
                 { "Name": "cspkg", "Path": "myApp.cspkg" },
         ]
         "UrlPrefix": "nuvola",
         "Region": "Anywhere, US",
        },
        {
         "Name": "Database 1",
         "Type":
         "Microsoft.ApplicationServer.Management.SQLServer",
         "Artifacts": [ { "Name": "dbDac", "Path":
         "DacPak1.dacpak" } ]
        },
        {
         "Name": "Cache 1",
         "Type": "Microsoft.ApplicationServer.Management.Cache",
         "CacheName": "default"
        }
    ]
}
```

By defining the application using the application schema described herein, users gain the capability to control all of the resources in the application as a single unit (e.g. "N-as-1" management). In this way, when an action is performed on the application, that action is applied to all resources in the application on an as-needed basis. For example, a command may be applied to the application and the resources act on the command in the appropriate order. Commands are typically defined using verbs such as "start," "stop," "deploy," "upgrade," etc. The application applies the command to each relevant resource in the order required for the command to take effect. In one embodiment, for example, a "deploy" command may require that the application deploy a database resource 203 before deploying a website resource 202.

The application model also allows for monitoring and diagnostics of the application and its resources. The health of each resource or part of the application may be monitored as a whole. Monitoring data 205 may be collected from interfaces between the resources 202-204 to provide a view of the application's overall health.

The application model further allows for policies to be asserted against all of the resources as a group. Polices may be defined and then reflected against the application model. For example, application security policies may be applied to the application by providing a list of certificates and associated expiration dates. The resources that need the certificates may then use them and request renewal when they expire.

Various configurations may be defined for the application model. When the application is deployed, a selected configuration may be available for users.

Figure 3:
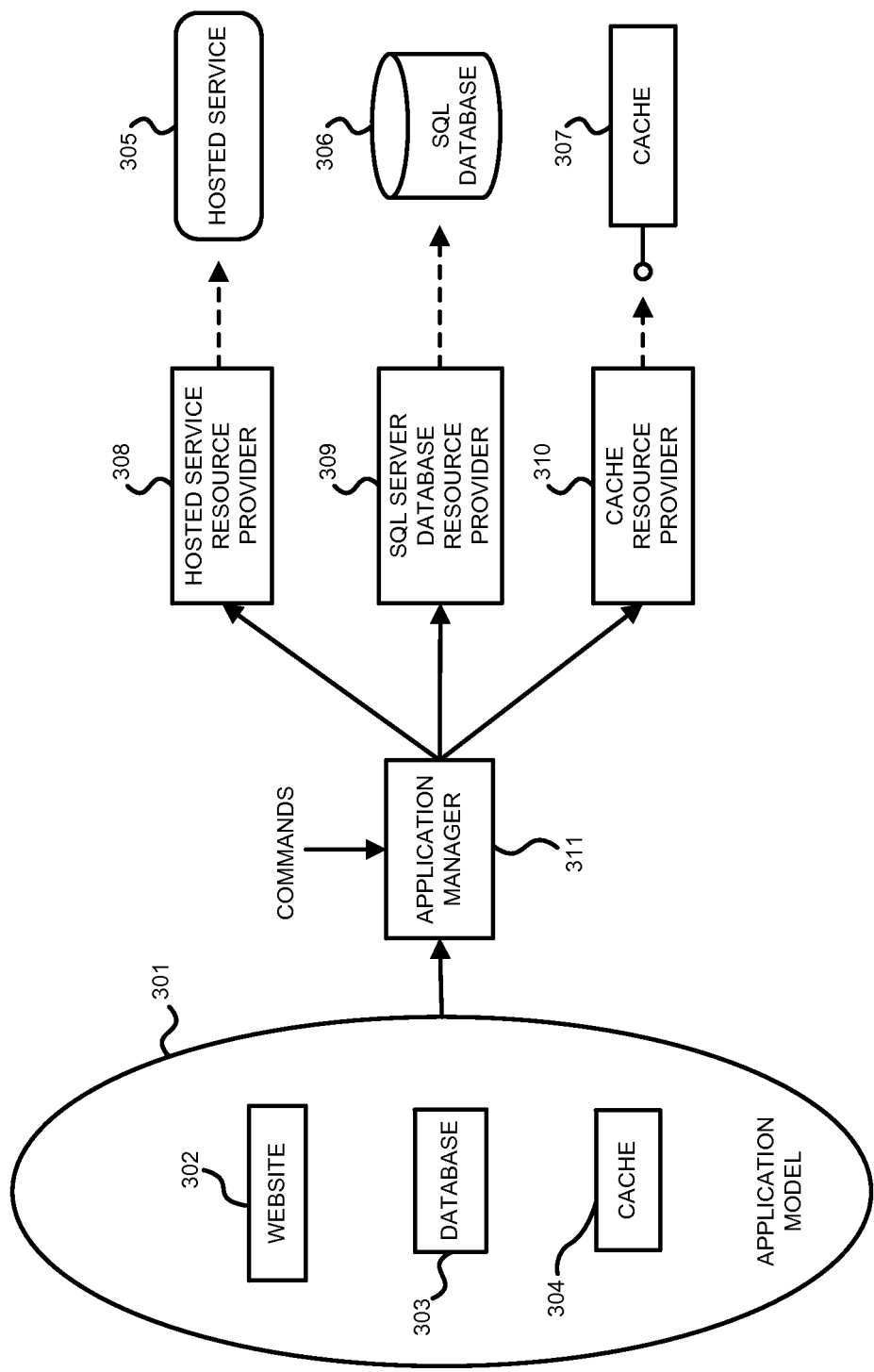
FIG. 3 is a block diagram illustrating management of resources used in an application.

FIG. 3 is a block diagram illustrating management of resources used in an application. Application model 301 includes resource metadata 302-304. Each resource metadata 302-304 is associated with a different resource technology 305-307. Resource metadata 302-304 is used by the application model to work together as a single application; however, the resource metadata must be used to communicate with the domain specific technology 305-307. Resource providers 308-310 use the resource metadata 302-304 and communicate with a resource in its native language or protocol. An application manager 311 receives the application model 301 and commands applied against the application. Application manager 311 uses resource providers 308-310 to manage operations of the application.

Resource providers 308-310 are plug-ins abstracting management operations. There is one resource provider 308-310 per resource type 305-307. Resource providers 308-310 are passive code that is controlled by the application manager 311, which coordinates work between the resource providers. Application manager 311 determines which resources should receive a particular command and in what order the command should be applied to each resource. For example, when a "deploy" command is received, the application manager 311 identifies required resources 305-307 and may first deploy database resource 306 before starting hosted service 305 and then starting cache 307. Application manager 311 controls long-running work on the resources and synchronizes tasks as needed among resources. Using the separate resource providers 308-310, application manager 311 is able to work on different tasks in parallel.

Figure 4:
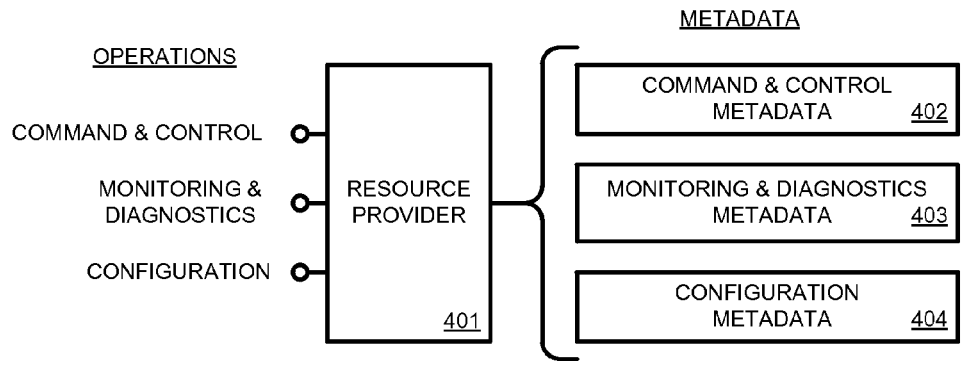
FIG. 4 is a block diagram illustrating resource provider interfaces.

FIG. 4 is a block diagram illustrating resource provider interfaces. The resource provider 401 exposes interfaces allowing the application management system to interact with a resource. Resource provider 401 also includes metadata 402-404 describing the resource for management purposes. Separate resource provider metadata is provided for command and control (402) of the resource, gathering health and diagnostic information (403) from the resource, and configuration (404) of the resource. The resource provider interface makes very different technologies look the same to the application manager. The interfaces provide a contract between the resource provider and the application manager. The interfaces include metadata 402-404 that allows a user to define how to interact with the resource and actual code to implement the contract at runtime.

A command and control resource provider for a resource defines operations that should be supported by the application. The operations may include standard or built-in actions and custom actions. The operations include verbs for lifecycle events (e.g. provisioning, unprovisioning, deploying, start, stop, verify, getState, configure, enumerate, etc.), custom commands (e.g. purge queue), and other operations such as the enumeration of child entities. The metadata includes, for example, credentials to manage the resource, definitions of custom commands, and a hierarchy of child entities. The metadata defines how things can happen and allows users to select which item they want to execute an operation against.

In one embodiment, a schema for command and control metadata for a hosted service may be represented as:

```
{
    "Name": "Hosted Service" ,
    "Description": "a cloud hosted service",
    "Resource Type":
    "Microsoft.ApplicationServer.Management.HostedService",
    "Entities": {
        { "Name": "Slot",
            "Children": { [
                { "Name": "Web Role Instance"},
                { "Name": "Worker Role Instance"}
            ] }
        }
    }
}
```

In one embodiment, the operations supported by the monitoring and diagnostics resource provider include, for example, starting and stopping health monitoring and retrieving diagnostic logs. The operations may use verbs such as "start," "stop," and "emit event" for monitoring the application and "getLog" for diagnosing errors from the application. The metadata for a monitoring and diagnostics resource provider includes credentials for monitoring and diagnosing the resource and a description of health events in the application. The interface metadata defines things to be acted upon, such as collecting health events to be emitted by the resource handler. The health event may be defined in one embodiment by name, description, unit, and/or aggregation.

In one embodiment, a schema for monitoring and diagnostic metadata may be represented as:

```
{
    "Health Monitoring": [
        {
            "Name": "Transactions Count" ,
            "Description": "number of transactions",
            "Unit": "Transactions",
            "Aggregation" : "Aggregations.Total",
            "IsError": false
        }
    ]
}
```

A configuration resource provider in one embodiment supports operations for discovering application properties. The operations may use verbs such as "get," "set," and "dispatch" for configuring the application. The metadata for a configuration resource provider includes a properties description and properties schema to assist editing. The configuration metadata defines a collection of properties with the following metadata on the properties: description, type, validation regexp, isSecure.

Figure 5:
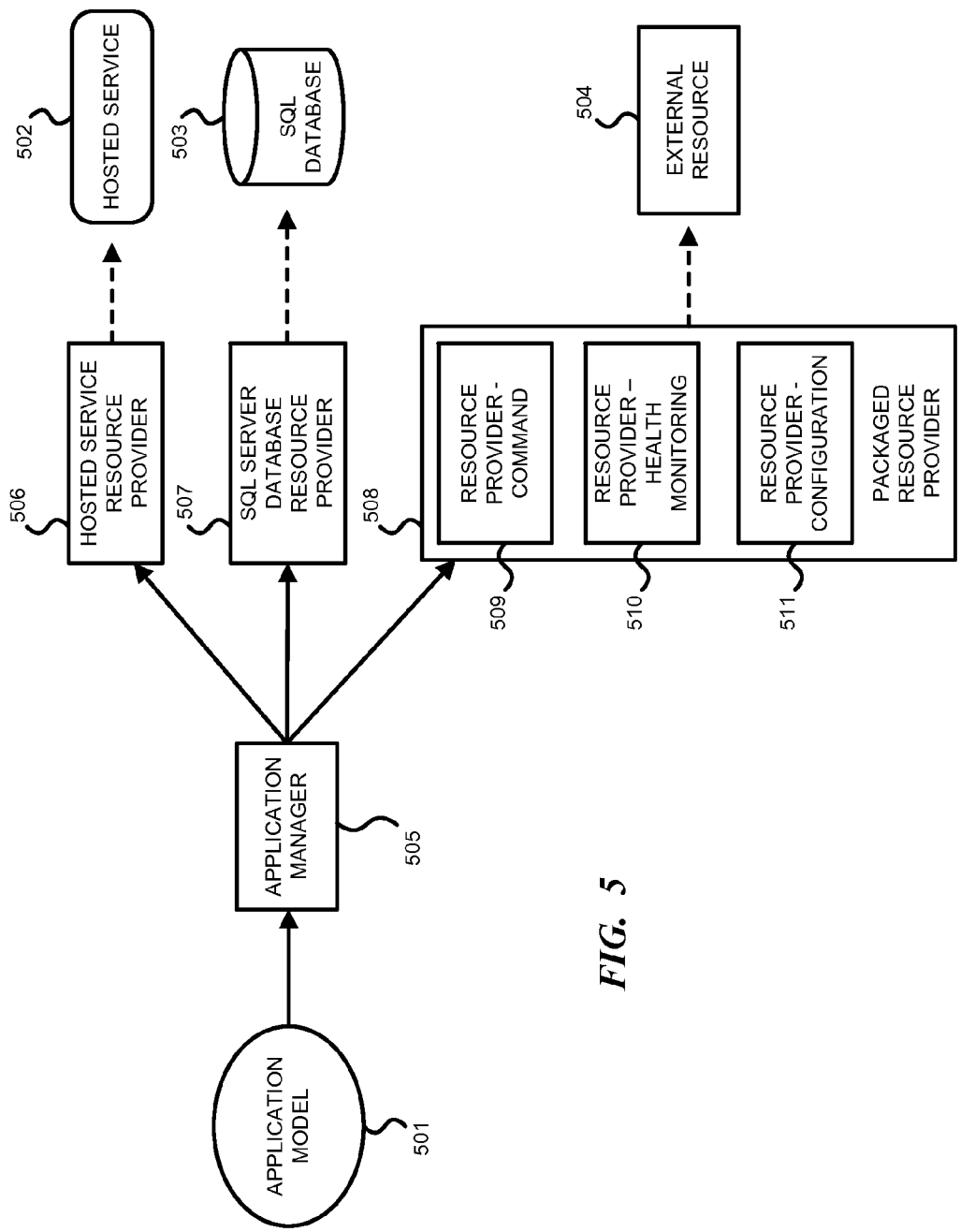
FIG. 5 is a block diagram illustrating how a command and control, monitoring and diagnostics, and configuration resource providers may be combined into a single resource provider for any resource.

FIG. 5 is a block diagram illustrating how a command and control, monitoring and diagnostics, and configuration resource providers may be combined into a single resource provider for any resource. Application model 501 defines an application comprising several resources 502-504. For example, the application may have a website that uses a hosted service resource 502, a database that uses SQL database resource 503 and any other service using additional external resource 504. Application manager 505 receives the application model 501 and controls the resources 502-504 using resource providers 506-508. Application manager 505 identifies the proper resource provider for each resource required by application 501. Application manager 505 then sends the metadata for the resource to the appropriate resource provider.

A hosted service resource provider is used by application manager 505 to control hosted service 502. A database resource provider 507 is used to control database resource 503. Packaged resource provider 508 is used to control external resource 504. In one embodiment, packaged resource provider comprises specific command and control 509, monitoring and diagnostics 510, and configuration 511 resource providers that are combined into a single binary package to perform these functions. Each other resource providers 506 and 507 may also comprise specific command and control, monitoring and diagnostics, and configuration resource providers. Each resource provider 506-508 accepts command, health and configuration metadata, which is then processed by the appropriate command, health or configuration subsystem 509-511.

Figure 6:
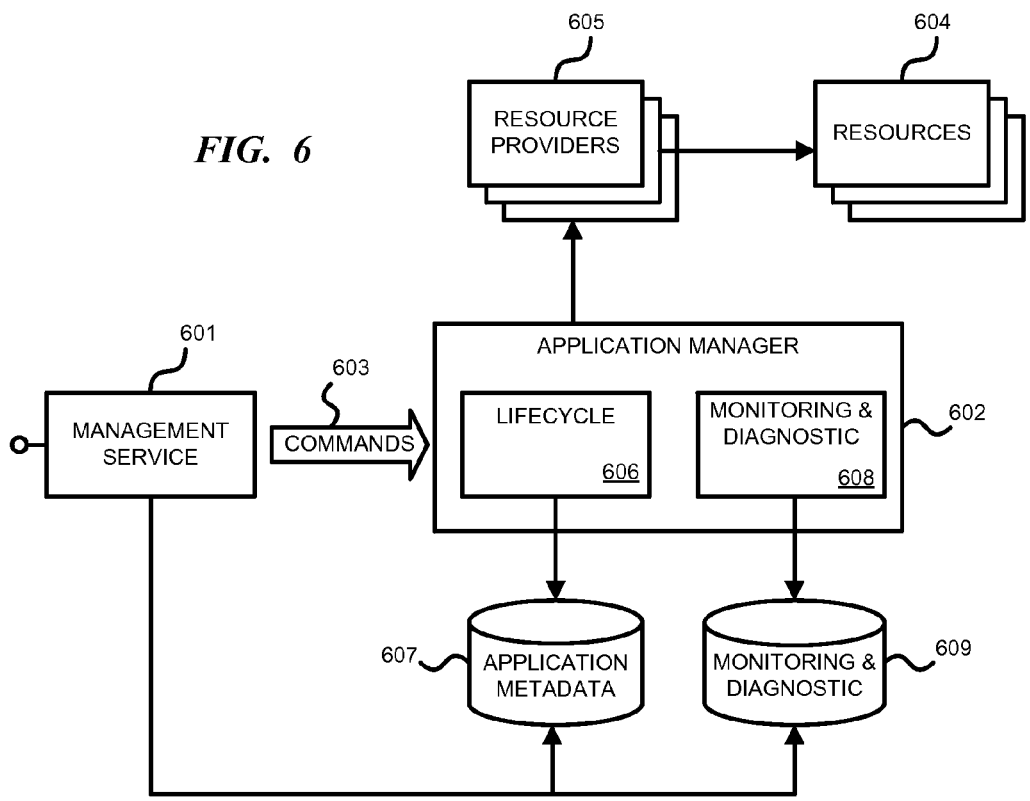
FIG. 6 is a block diagram illustrating the system architecture according to one embodiment.

FIG. 6 is a block diagram illustrating the system architecture according to one embodiment. Management service 601 provides a front-end user interface that is used to fulfill user requests and interact with application manager 602. Users may enter commands 603 for the application, such as CRUD operations (create, read, update, delete). Users may also query the health of the application and receive application health information via the management service, such as how many errors have occurred. Application manager 602 controls resources 604 using resource providers 605.

Application manager 602 comprises a lifecycle subsystem 606 that provides services such as starting and stopping resources. Lifecycle subsystem 606 also controls the order in which the resources perform commands. Lifecycle subsystem 606 accesses application metadata, such as from the application model, which may be stored in application metadata store 607 from management service 601. Monitoring and diagnostic subsystem 608 is used to monitor the health of the application and resources. Monitoring and diagnostic subsystem 608 calculates and aggregates application health data, such as a number of errors that are detected, which may be stored to monitoring and diagnostic store 609.

Figure 7:
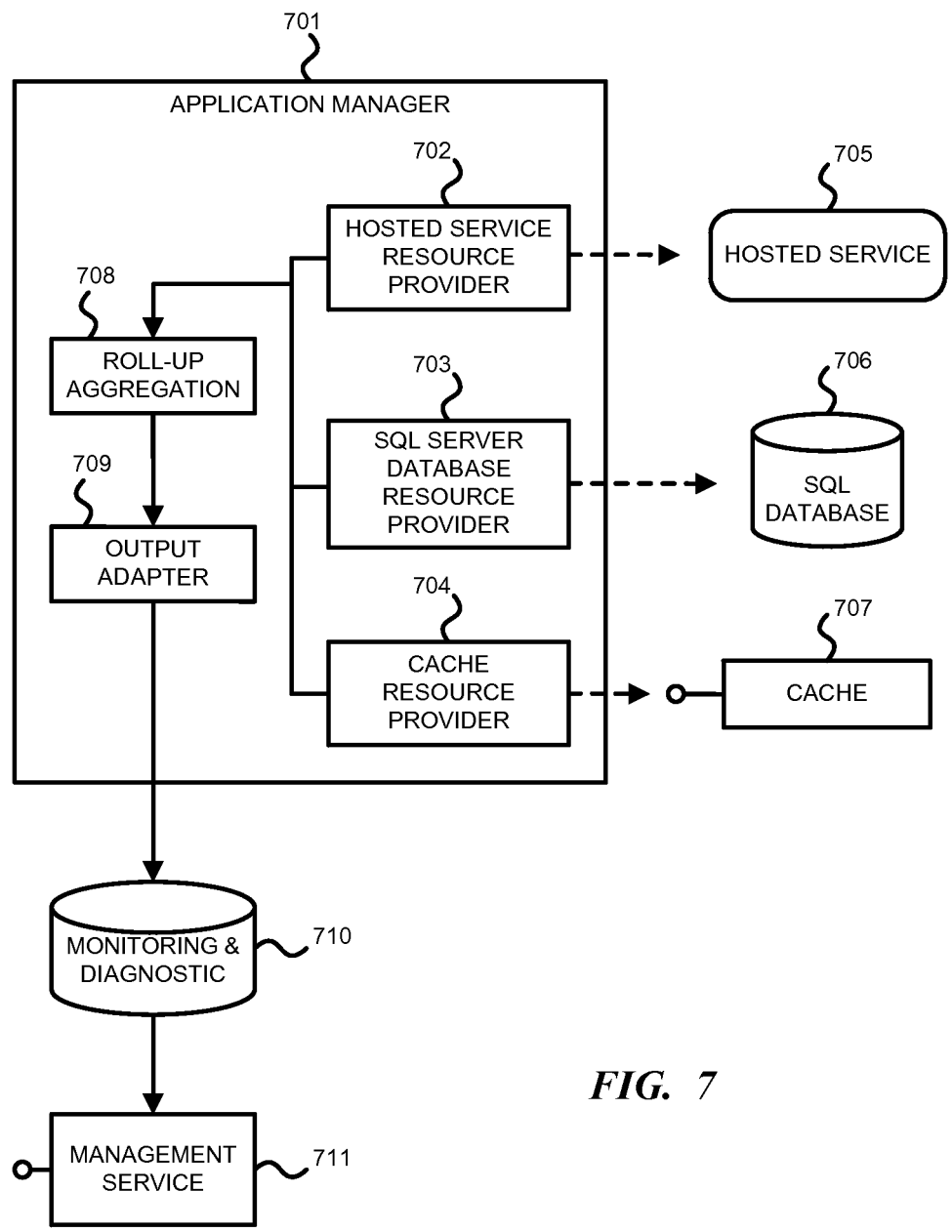
FIG. 7 is a block diagram illustrating components of a resource monitoring system according to one embodiment.

FIG. 7 is a block diagram illustrating components of a resource monitoring system according to one embodiment. Application manager 701 uses resource providers 702-704 to communicate with and control resources 705-707. In addition to the command and control information flowing from the resource providers 702-704 to resources 705-707, health data flow from the resources to the resource providers. This health data may include, for example, error data for resources 705-707. The health data is collected and aggregated in roll-up aggregation module 708. For example, the number of errors from each resource may be added in aggregation module 708 so that users can determine the total number of errors without having to drill down to each resource.

Aggregated health data is output from application manager 701 via an output adapter 709 to monitoring and diagnostic store 710. Users may access this health data via management service 711, which may be a user interface that allows queries to be sent monitoring and diagnostic store 710 in one embodiment.

Figure 8:
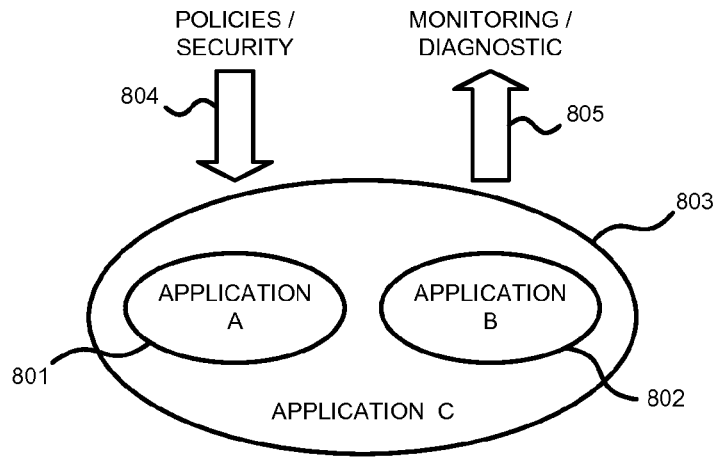
FIG. 8 is block diagram illustrating the combination of two separate applications into one larger combined application according to one embodiment.

FIG. 8 is block diagram illustrating the combination of two separate applications into one larger combined application according to one embodiment. Application A 801 and application B 802 may be defined using separate application models. A new application C 803 may be created from application A 801 and application B 802 by combining their application models. A new application model for application C 803 merges all of the metadata from application A 801 and application B 802. The combination of the application models for A 801 and B 802 does not require a change in either applications code. However, after the code is combined, applications A 801 and B 802 may be treated as a single entity and configured, deployed, and monitored as a unit.

Policies 804, such as security or authentication policies, may be applied to the combined application C 803. The policies flow down to application A 801 and application B 802 and are used as required by those applications. Monitoring and diagnostic information 805, such as application health data and statistics, flows up from application A 801 and application B 802. The monitoring data for both applications A and B 801, 802 are aggregated and the aggregated data represents the health of application C 803.

Figure 9:
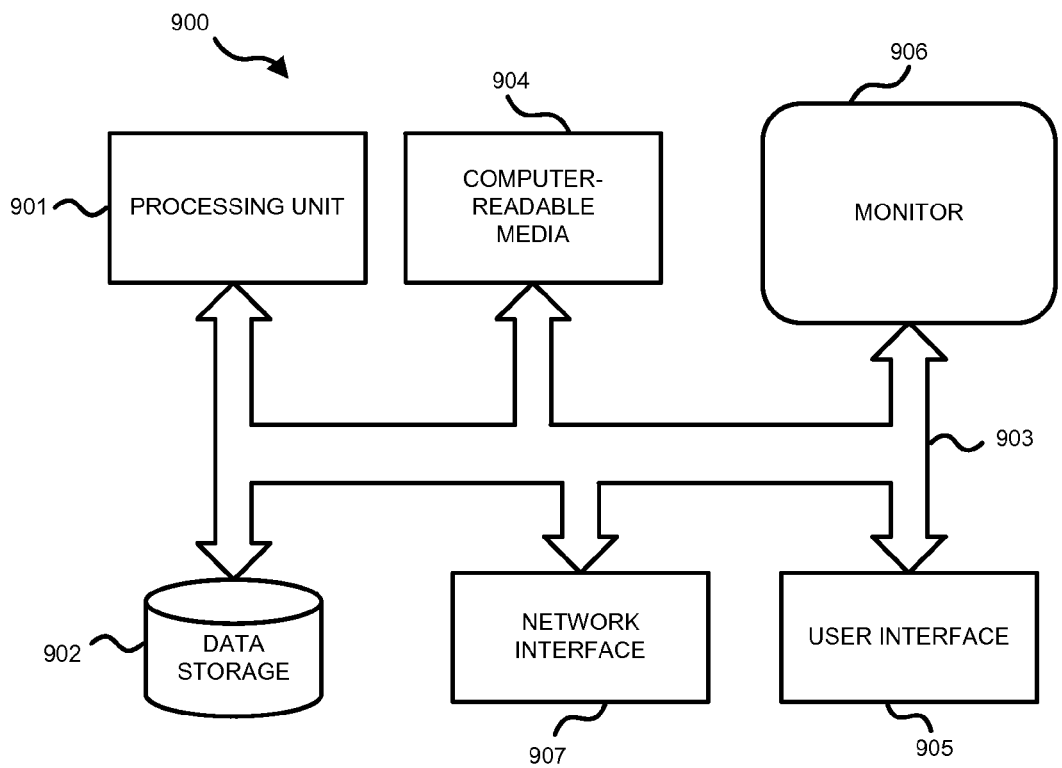
FIG. 9 illustrates one embodiment of a computing and networking environment.

FIG. 9 illustrates an example of a suitable computing and networking environment 900 on which the examples of FIGS. 1-8 may be implemented. The computing system environment 900 is only one example of a suitable computing environment and is not intended to suggest any limitation as to the scope of use or functionality of the invention. The systems and methods disclosed herein are operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 900. Components may include, but are not limited to, processing unit 901, data storage 902, such as a system memory, and system bus 903 that couples various system components including the data storage 902 to the processing unit 901. The system bus 903 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 900 typically includes a variety of computer-readable media 904. Computer-readable media 904 may be any available media that can be accessed by the computer 901 and includes both volatile and nonvolatile media, and removable and non-removable media, but excludes propagated signals. By way of example, and not limitation, computer-readable media 904 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 902 includes computer storage media in the form of volatile and/or nonvolatile memory such as read only memory (ROM) and random access memory (RAM). A basic input/output system (BIOS), containing the basic routines that help to transfer information between elements within computer 900, such as during start-up, is typically stored in ROM. RAM typically contains data and/or program modules that are immediately accessible to and/or presently being operated on by processing unit 901. By way of example, and not limitation, data storage 902 holds an operating system, application programs, and other program modules and program data.

Data storage 902 may also include other removable/non-removable, volatile/nonvolatile computer storage media. By way of example only, data storage 902 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 9, provide storage of computer-readable instructions, data structures, program modules and other data for the computer 900.

A user may enter commands and information through a user interface 905 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 901 through a user input interface 905 that is coupled to the system bus 903, but may be connected by other interface and bus structures, such as a parallel port, game port or a universal serial bus (USB). A monitor 906 or other type of display device is also connected to the system bus 903 via an interface, such as a video interface. The monitor 906 may also be integrated with a touch-screen panel or the like. Note that the monitor and/or touch screen panel can be physically coupled to a housing in which the computing device 900 is incorporated, such as in a tablet-type personal computer. In addition, computers such as the computing device 900 may also include other peripheral output devices such as speakers and printer, which may be connected through an output peripheral interface or the like.

The computer 900 may operate in a networked environment using logical connections 907 to one or more remote computers, such as a remote computer. The remote computer may be a personal computer, a server, a router, a network PC, a peer device or other common network node, and typically includes many or all of the elements described above relative to the computer 900. The logical connections depicted in FIG. 9 include one or more local area networks (LAN) and one or more wide area networks (WAN), but may also include other networks. Such networking environments are commonplace in offices, enterprise-wide computer networks, intranets and the Internet.

When used in a LAN networking environment, the computer 900 may be connected to a LAN through a network interface or adapter 907. When used in a WAN networking environment, the computer 900 typically includes a modem or other means for establishing communications over the WAN, such as the Internet. The modem, which may be internal or external, may be connected to the system bus 903 via the network interface 907 or other appropriate mechanism. A wireless networking component such as comprising an interface and antenna may be coupled through a suitable device such as an access point or peer computer to a WAN or LAN. In a networked environment, program modules depicted relative to the computer 900, or portions thereof, may be stored in the remote memory storage device. It may be appreciated that the network connections shown are exemplary and other means of establishing a communications link between the computers may be used.

Figure 10:
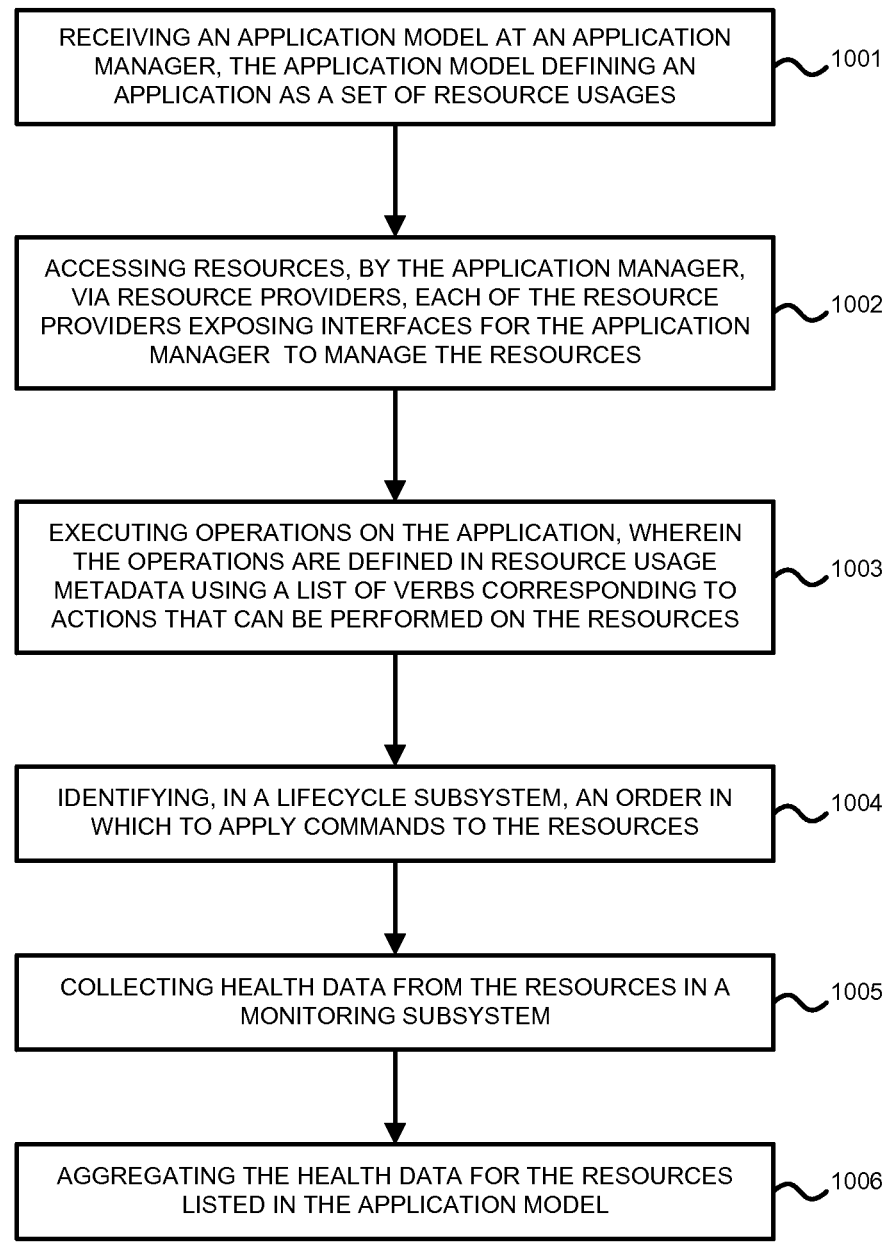
FIG. 10 is a flowchart illustrating a process according to one embodiment.

FIG. 10 is a flowchart illustrating a process according to one embodiment. In step 1001, an application model is received at an application manager. The application model defines an application as a set of resource usages. In step 1002, resources are accessed by the application manager via resource providers. Each of the resource providers exposes interfaces for the application manager to manage the resources. The resource usages are defined in the application model using resource usage metadata that establishes how the application interacts with the resources.

In step 1003, operations are executed on the application. The operations are defined in the resource usage metadata using a list of verbs corresponding to actions that can be performed on the resources. The list of verbs may include common verbs that correspond to actions that can be performed on all of the resources to enable management of all of the resources as a single unit (i.e. "N-as-1" management). Each of the interfaces define management operations are selected from operations consisting of command and control, health monitoring, diagnostics, and configuration operations.

The application manager may include a lifecycle subsystem. In step 1004, the lifecycle subsystem identifies an order in which to apply commands to the resources. The application manager may further include a monitoring subsystem. In step 1005, the monitoring subsystem collects health data from the resources. In step 1006, the health data is aggregated for the resources in the application model.

It will be understood that steps 1001-1006 of the process illustrated in FIG. 10 may be executed simultaneously and/or sequentially. It will be further understood that each step may be performed in any order and may be performed once or repetitiously.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
  receiving an application model at an application manager, wherein the application model defines an application as a set of resource usages and wherein the application manager manages the operation of the application;
  accessing the resources, by the application manager, via resource providers, each of the resource providers exposing interfaces for the application manager to manage each of the resources using a respective resource provider, wherein the resource providers provide command and control, health monitoring, diagnostic, and configuration operations to respective resources;

identifying, in a lifecycle subsystem of the application manager, an order in which to apply commands to the resources;

issuing commands, by the application manager, to the resources via a respective resource provider;

collecting health data outputs from each of the resources by the respective resource provider;

aggregating, by the application manager, health data outputs from each of the resource providers into a single set of data; and accessing the single set of data, by a user of the application, without requiring access to health data for each resource.

2. The method of claim 1, wherein each of the resource usages are defined in the application model using resource usage metadata that establishes how the application interacts with the resources.

3. The method of claim 2, further comprising:

executing operations on the application, wherein the operations are defined in the resource usage metadata using a list of verbs corresponding to actions that can be performed on the resources.

4. The method of claim 3, wherein the list of verbs includes common verbs corresponding to actions that can be performed on all of the resources to enable management of all of the resources as a single unit.

5. The method of claim 1, wherein each of the interfaces define management operations are selected from operations consisting of command and control, health monitoring, diagnostics, and configuration operations.

6. The method of claim 1, wherein the order further includes deploying a cache resource before deploying a database resource.

7. The method of claim 1, wherein the application manager comprises a monitoring subsystem, and the method further comprising:

collecting, in the monitoring subsystem, health data from the resources; and aggregating the health data for the resources in the application model.

8. A computer-readable storage device having computer-executable instructions stored thereon that, upon execution by at least one processor of a computer system, cause the computer system to:

receive an application model at an application manager, the application model defining an application as a set of resource usages, wherein the application manager manages the operation of the application;

access the resources, by the application manager, via resource providers, each of the resource providers exposing interfaces for the application manager to manage each of the resources using a respective resource provider, wherein the resource providers provide command and control, health monitoring, diagnostic, and configuration operations to respective resources;

identify an order in which to apply commands to the resources, wherein the order includes deploying a database resource before deploying a website or hosted resource;

issue commands, by the application manager, to the resources via a respective resource provider;

collect health data outputs from each of the resources by the respective resource provider;

aggregate, by the application manager, health data outputs from each of the resource providers into a single set of data; and access the single set of data, by a user of the application, without requiring access to health data for each resource.

9. The computer-readable storage device of claim 8, wherein each of the resource usages are defined in the application model using resource usage metadata that establishes how the application interacts with the resources.

10. The computer-readable storage device of claim 9, wherein the computer-executable instructions, upon execution by the at least one processor, further cause the computer system to:

execute the operations on the application, wherein the operations are defined in the resource usage metadata using a list of verbs corresponding to actions that can be performed on the resources.

11. The computer-readable storage device of claim 10, wherein the list of verbs includes common verbs corresponding to actions that can be performed on all of the resources to enable management of all of the resources as a single unit.

12. The computer-readable storage device of claim 8, wherein each of the interfaces define management operations are selected from operations consisting of command and control, health monitoring, diagnostics, and configuration operations.

13. The computer-readable storage device of claim 8, wherein the application manager comprises a lifecycle subsystem, and the order further includes deploying a cache resource before deploying a database resource.

14. The computer-readable storage device of claim 8, wherein the application manager comprises a monitoring subsystem, and the computer-executable instructions, upon execution by the at least one processor, further cause the computer system to:

collecting, in the monitoring subsystem, health data from the resources; and aggregating the health data for the resources in the application model.

15. A system for running applications, comprising:

a processor configured to host an application manager adapted to receive an application model, the application model defining an application as a set of resource usages, the application manager adapted to manage operations of the application and further adapted to identify an order in which to apply commands to the resources; and a plurality of resource providers, each of the resource providers configured to expose interfaces for the application manager to manage the resources using a respective resource provider, the interfaces defined using metadata that establishes how the resource providers provide access to resources by the application manager, wherein the resource providers provide command and control, health monitoring, diagnostic, and configuration operations to respective resources, the application manager configured to issue commands to the resources via a respective resource provider and to aggregate health data outputs from each of the resource providers into a single set of data;

the resource providers configured to collect the health data outputs from each of the respective resources.

16. The system of claim 15, wherein each of the resource usages are defined in the application model using resource usage metadata that establishes how the application interacts with the resources.

17. The system of claim 16, wherein the application manager is adapted to execute operations on the application, the operations are defined in the resource usage metadata using a list of verbs corresponding to actions that can be performed on the resources.

18. The system of claim 17, wherein the list of verbs includes common verbs corresponding to actions that can be performed on all of the resources to enable management of all of the resources as a single unit.

19. The system of claim 17, wherein each of the interfaces define management operations are selected from operations consisting of command and control, health monitoring, diagnostics, and configuration operations.

20. The system of claim 17, further comprising:
a monitoring subsystem adapted to collect health data from the resources and to aggregate the health data for the resources in the application model.

* * * * *